(12) United States Patent
Gioscia et al.

(10) Patent No.: US 6,421,305 B1
(45) Date of Patent: Jul. 16, 2002

(54) PERSONAL MUSIC DEVICE WITH A GRAPHICAL DISPLAY FOR CONTEXTUAL INFORMATION

(75) Inventors: Richard Gioscia, Mahwah, NJ (US); Yumi Sonoda, Los Altos, CA (US); Jan-Christoph Zoels, Brooklyn, NY (US)

(73) Assignees: Sony Corporation (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/190,260

(22) Filed: Nov. 13, 1998

(51) Int. Cl.[7] ............................................. G11B 17/22
(52) U.S. Cl. .................... 369/30.06; 345/156; 345/173; 345/636; 369/24; 369/30; 369/33; 369/34; 369/37
(58) Field of Search .................. 345/173, 156, 345/159, 169, 636; 369/24, 30, 30.06, 33, 34, 37

(56) References Cited

U.S. PATENT DOCUMENTS

| | | | | |
|---|---|---|---|---|
| 5,684,511 A | * | 11/1997 | Westerink et al. | 345/157 |
| 5,769,719 A | * | 6/1998 | Hsu | 345/156 |
| 5,781,889 A | * | 7/1998 | Martin et al. | 705/1 |
| 5,848,398 A | * | 12/1998 | Martin et al. | 705/14 |
| 5,852,432 A | * | 12/1998 | Kim | 345/156 |
| 5,914,707 A | * | 6/1999 | Kono | 345/173 |
| 5,959,945 A | * | 9/1999 | Kleiman | 369/30 |
| 6,031,795 A | * | 2/2000 | Wehmeyer | 369/30 |
| 6,252,831 B1 | * | 6/2001 | Wehmeyer | 369/30 |

* cited by examiner

*Primary Examiner*—Richard Hjerpe
*Assistant Examiner*—Ali Zamani
(74) *Attorney, Agent, or Firm*—Radar, Fishman & Grauer PLLC; Ronald P. Kananen, Esq.

(57) ABSTRACT

An audio system for playing recordings of audio programming includes a relatively large display device on which contextual information about the audio programming may be displayed. The contextual information is recorded on the same recording medium as the audio programming and may include any textual information or graphic images related to the audio programming or the artists who produced it. Preferably, the audio system is a personal, portable audio system which is battery-operated and which reads mini-discs.

15 Claims, 4 Drawing Sheets

PERSONAL MUSIC DEVICE WITH A GRAPHICAL DISPLAY FOR CONTEXTUAL INFORMATION

FIELD OF THE INVENTION

The present invention relates to the field of audio systems, particularly personal music devices. More specifically, the present invention relates to a personal music device with a graphic display device for displaying contextual information in conjunction with the music recordings being played.

BACKGROUND OF THE INVENTION

Music for personal use is conventionally recorded on tape cassettes or, more popularly, compact discs (CDs). These recording media, particularly compact discs, can contain substantial amounts of recorded music that can be played whenever desired.

Compact disc players and cassette tape player may be part of a high-quality home sound system, an automobile sound system, or a personal sound system. Most modern computers also include a compact disc drive that can play audio compact discs over the speakers of the computer. Personal portable sound systems such as the Walkman® or Discman® lines by Sony allow a user to play a cassette or compact disc audio recording virtually anywhere.

Conventionally, the commercial packaging with the tape or compact disc provides contextual information about the music. This contextual information includes, but is not limited to, cover art which may depict the artist or be conceptually or thematically related to the recorded music, printed lyrics for the music, identification of the artists or performers involved in producing the recorded music, notes about the music by the artists or songwriters, biographical information about the artists or songwriters, a listing of the titles of the musical pieces and their order on the recording, etc. For purposes of this discussion, contextual information includes any information about or related to the artists or music or other audio programming on a recording.

While this wealth of contextual information is conventionally available on the packaging of commercially available cassettes and compact discs, very little contextual information is usually provided on the cassette or compact disc itself. If the user is playing the cassette or compact disc on a portable player, it may be inconvenient to take the packaging along with the player for access to the contextual information.

For example, many people store a number of compact discs in a book-like portfolio with plastic pages containing pockets for retaining individual discs. Such portfolios are easy to travel with or keep in the user's car and provide storage for a number of discs without the bulk of the disc's original packaging. Unfortunately, the user is then left with only the minimal contextual information on the disc itself.

Additionally, even the minimal contextual information available on the cassette or disc itself is no longer available once the cassette or disc is inserted in a player, whether a personal or home system. Most cassette tape players contain no display of any kind for displaying information about the playback of the tape. Disc players typically have only a small liquid crystal display (LCD) which displays, for example, the number of the track being played, e.g. Track 1, Track 2, etc. and the elapsed time during which the track has been playing.

Compact disc players incorporated into computers often have a more sophisticated display available through the computer monitor. For example, the software which drives the CD drive may display on the computer screen a list of the available tracks. If the user wishes, he or she may type into the computer the titles of each of the tracks. These titles are then stored in the computer. However, this is obviously a burdensome procedure, especially if more than one or two discs are frequently played by the user.

Additionally, some commercially available computers include a compact disc drive capable of writing on optical discs. The optical disc being written may be a standard compact disc or a mini-disc (MD). With such a writable disc, a user may compile a disc-full of favorite songs from several other discs. Alternatively, the user may download recordings from a computer network, such as the internet, for storage on the writable disc.

Where the user has personally created a disc of musical recordings, there is no original packaging with contextual information available. At best, the user may make written notes to be kept with the casing of the disc to record some contextual information.

Accordingly, there is a need in the art for a method and apparatus for providing contextual information about a music recording while it is loaded in a player and without reference to the original packaging, if any exists.

SUMMARY OF THE INVENTION

Consequently, it is an object of the present invention to meet the above-described needs and others. Specifically, it is an object of the present invention to provide a method and apparatus allowing a user to more readily obtain and access contextual information for musical recordings. Additionally, it is an object of the present invention to provide a method and apparatus for allowing a user to more easily navigate through the available tracks on a musical recording.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as an audio system for reading a recording which contains both audio programming and contextual information about the audio programming. The system of the present invention preferably includes a processor driving a display device; and a reader for reading a recording medium on which audio programming and contextual information about the audio programming are recorded. The reader provides an audio signal to the processor representing the audio programming and a data signal representing the contextual information. The processor then displays the contextual information on the display device and supplies the audio signal to an audio transducer, e.g. a speaker or a port for headphones.

Preferably, the display device is a color liquid crystal display. The display device may also include a touch screen for receiving user input which is transmitted to the processor to control access to and display of the contextual information and playback of the audio programming.

In a touch screen is not used, the audio system preferably includes some other user input device for controlling the processor in accessing and displaying the audio programming and contextual information, respectively. Such a user input device may include a trackball and a selection button, or a four-way button or joystick and a selection button.

When a preferred embodiment, the audio system of the present invention is a self-contained, battery-powered personal audio system. Particularly, in a personal audio system, the reader of the present invention may be a mini-disc reader.

The present invention also encompasses a recording of music in combination with contextual information about the music. The recording comprises a recording medium having recorded thereon a plurality of musical works organized into numbered tracks with contextual information associated with the musical works being recorded on the recording medium also.

The present invention also encompasses a system for recording audio programming in combination with contextual information about the audio programming. The system includes a processor for receiving and organizing the audio programming and the contextual information; and a recorder connected to the processor for recording on a recording medium the audio programming in combination with the contextual information. Preferably, the recorder is a mini-disc recorder.

Preferably, the processor is connected to a computer network for receiving the audio programming or the contextual information over the network. Additionally, the processor may be connected to a recording media reader for reading from a recording medium the audio programming or the contextual information. If the system is used commercially, the processor may accept payment for compiling the audio programming and the contextual information on a recording medium.

The present invention also encompasses a method of playing a recording from a recording medium which has recorded thereon both audio programming and contextual information about the audio programming. The method includes the steps of retrieving both the audio programming and the contextual information from the recording medium with a player; and displaying the contextual information on a display device of the player. Preferably, the contextual information includes image data and the method further comprises displaying an image from the image data on the display device.

The method may also includes the steps of transducing the audio programming to render the audio programming as audible sound; and controlling the transducing with a user input device on the player. To facilitate access to the programming and contextual information, the method may include organizing the contextual information with one or more menus; displaying the one or more menus on the display; and accessing the contextual information using the menus and a user input device on the player.

The present invention also encompasses a method of recording audio programming by associating contextual information about the audio programming; and recording the audio programming and associated contextual information on a common recording medium so that the contextual information may be accessed by a player playing the audio programming. Preferably, the step of recording further includes recording the audio programming and associated contextual information on a mini-disc. Where a computer network is used to distribute musical works and associated contextual information, the method of the present invention may include the steps of obtaining either of the audio programming or the contextual information from the computer network.

The present invention also encompasses a method of transmitting audio programming in combination with contextual information about the audio programming comprising transmitting over a computer network a data signal in which is encoded an audio signal representing the audio programming and a contextual signal representing the contextual information. The step of transmitting a data signal including a contextual signal may further include transmitting within the contextual signal either an image signal, a text signal or both.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Under the principles of the present invention, contextual information about musical or other audio works is recorded on a recording medium along with the work itself. A player for the recording preferably includes a relatively large display device on which this contextual information, once retrieved, can be displayed for the user.

Figure 1:
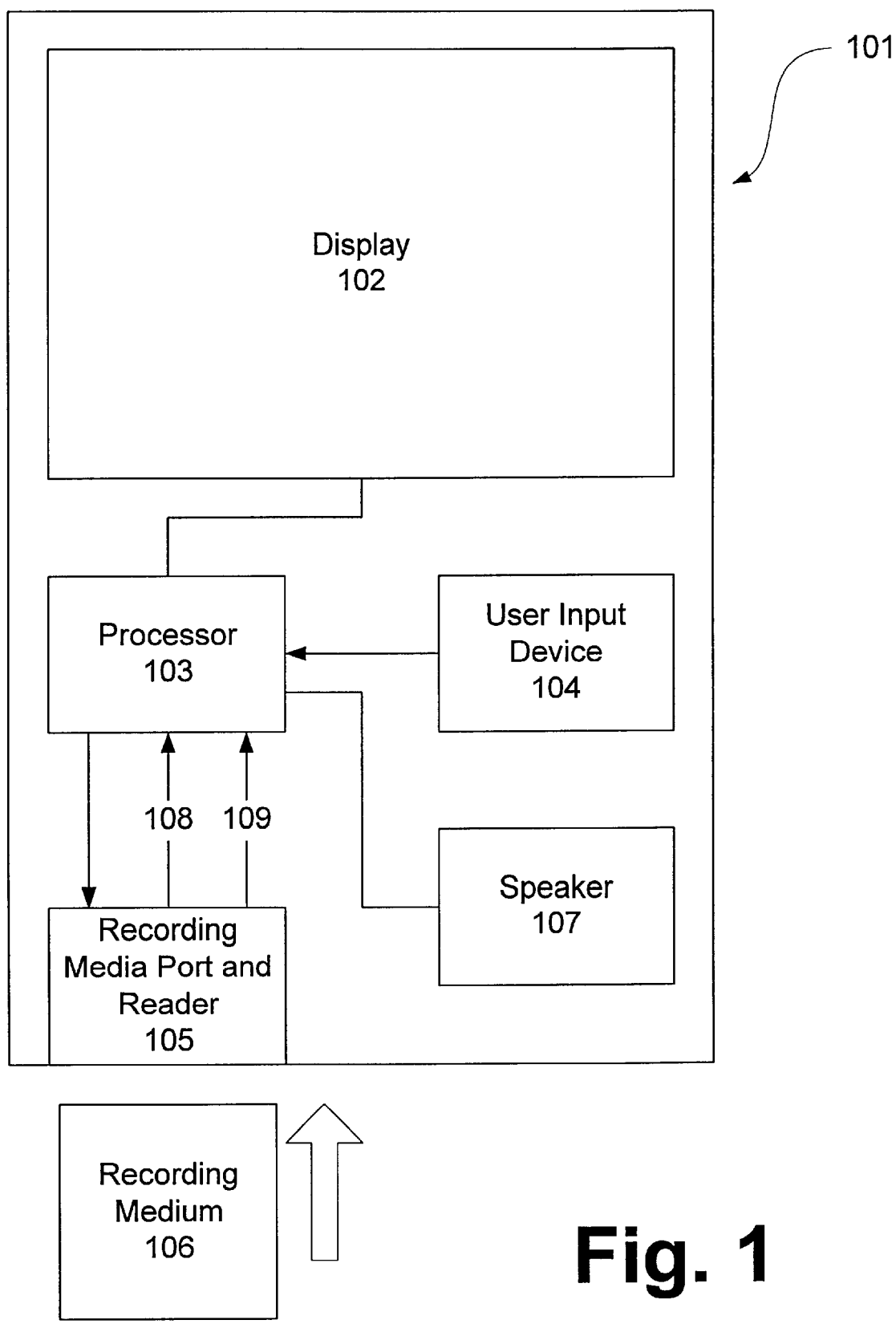
FIGS. 1 to 3 are block diagrams of various embodiments of a personal disc player according to the present invention.

Using the drawings, the preferred embodiments of the present invention will now be explained. FIG. 1 shows an audio system 101 according to the principles of the present invention. The audio system 101 may be, for example, a home audio system, a car audio system or, preferably, a portable personal audio system.

The audio system 101 includes a display device 102. The display device 102 is preferably a color liquid crystal display (LCD). The display 102 is relatively large, meaning that, if the system 101 is a personal audio system, the display 102 covers a majority of the surface of the player 101. Alternatively, if the system 101 is a home or car stereo system, the relatively large display 102 is substantially larger than traditional LCD displays that provide only one or two lines of information. The display 102 is also preferably a graphical display capable of displaying representations of photographs and other cover art associated with musical or other audio works.

The system 101 also includes a recording media reader 105. The recording medium 106 on which music or other audio programming is recorded, is inserted in the reader 105. Under the principles of the present invention, the recording medium 106 will include not only the recordings of musical or other audio works, but will also include contextual information for those works. However, if contextual information is not recorded, i.e., the recording is a conventional audio recording, the system 101 of the present invention will still read and play the recording.

The reader 105 is controlled by the processor 103 to retrieve the audio recording and contextual information stored on the recording medium 106. The reader 105 accordingly returns to the processor an audio signal 108 and/or a data signal 109. An audio signal 108 received by the processor 103 will be transferred to a transducer, e.g. a speaker 107, and rendered as audible sound. The data signal 109 carries the contextual information about the audio works on the medium 106 and may be displayed by the processor 103 on the display device 102.

The contextual information of data signal 109 may be graphic information, textual information or a combination of graphics and text. In other words, as noted above, the contextual information may include, but is not limited to, cover art which may depict the artist or be conceptually or thematically related to the recorded music, printed lyrics for the music, identification of the artists or performers involved in producing the recorded music, notes about the music by the artists or songwriters, biographical information about the artists or songwriters, a listing of the titles of the musical pieces and their order on the recording, etc. For purposes of this discussion, contextual information includes any information about or related to the music or other audio programming on a recording or the artists or producers of the work.

The contextual information is also preferably organized and accessed through graphical or textual menus which are displayed on the display device 102 so that the user can navigate among the contextual information he or she wishes to see. The audio programming may also be accessed and played through a graphic or textual menu displayed on display 102.

A user input device 104 is provided and connected to the processor 103 to allow the user to control the retrieval of contextual information and audio programming from the recording medium 106. Preferably, the user input device 104 includes, for example, a power button or switch, an eject button or control, and a device for moving a cursor on the display 102 and for selecting items from among a menu shown on the display 102. The device for moving a cursor on the display 102 may be any of a number of equivalent devices, for example, a selection button in combination with a four-way button, a trackball or a joystick.

Figure 3:
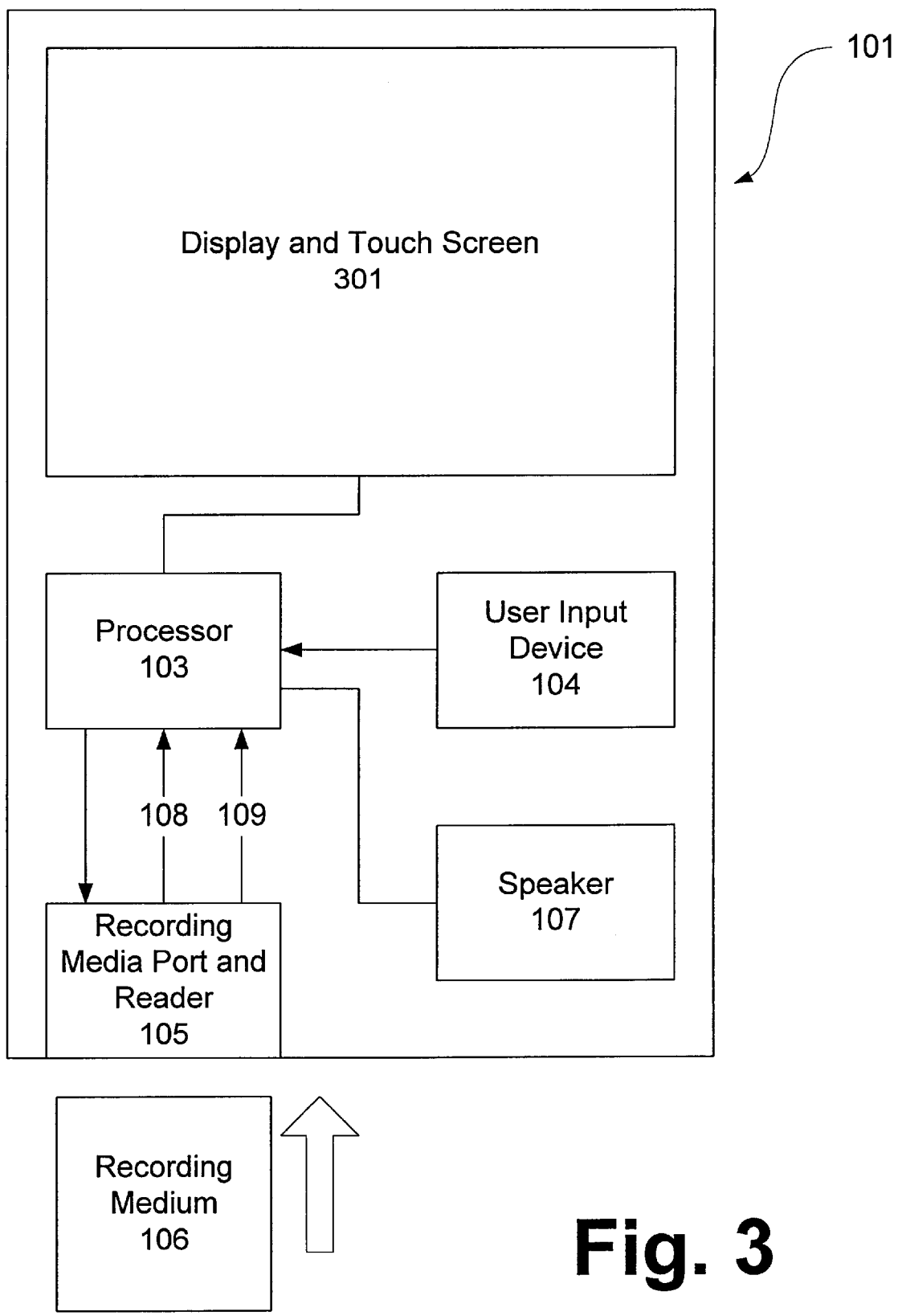

Alternatively, as illustrated in FIG. 3, the display device may include a touch-screen 301 which allows a user to select items from a menu on the display 301 by touching them, either with a finger or an electronic stylus (not shown). Such a touch screen may supplement or replace that portion of the user input device 104 which moves a cursor over the display for the selection of items.

Figure 2:
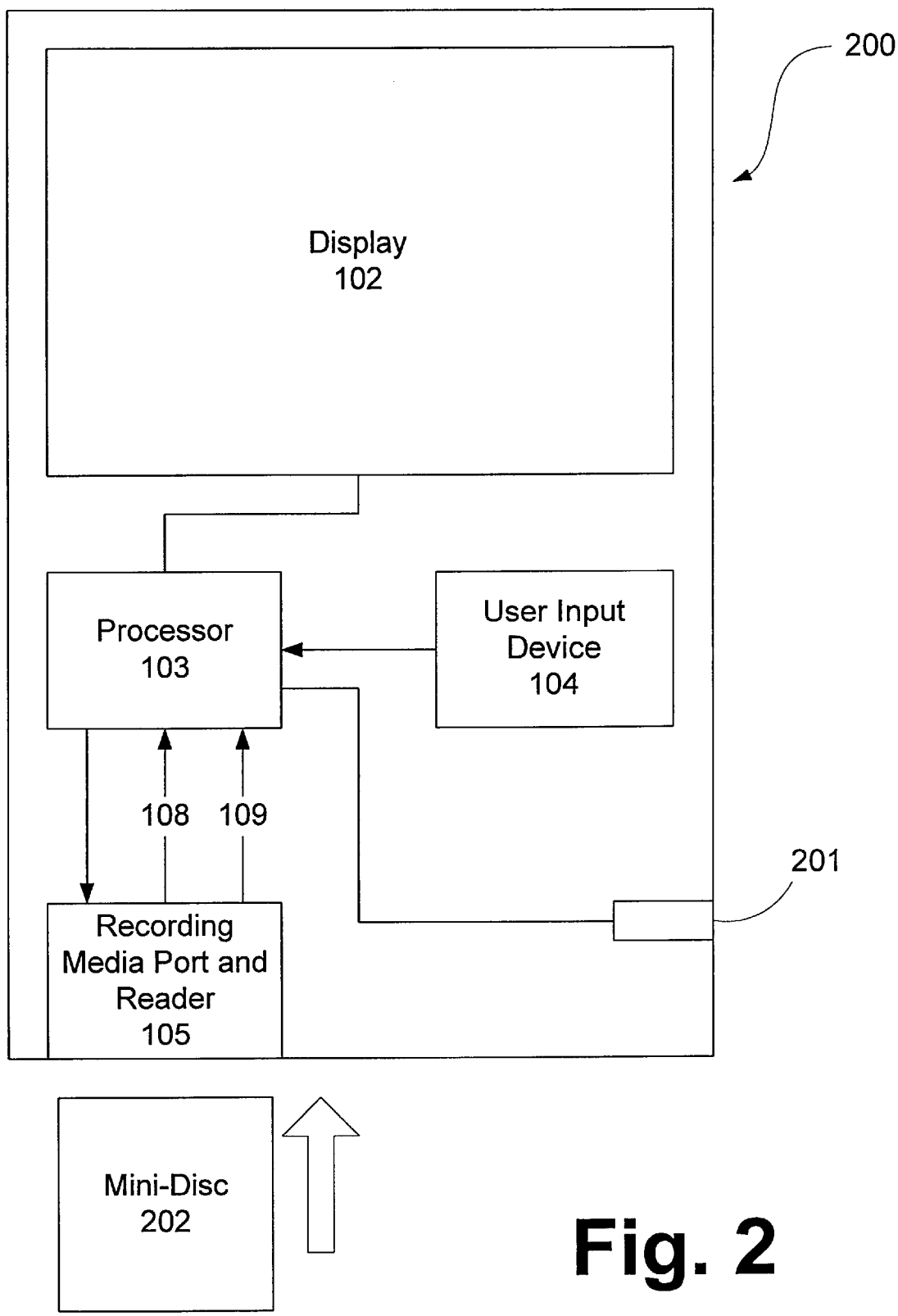

In a particularly preferred embodiment of the present invention, the audio system is a portable personal mini-disc player 200. As illustrated in FIG. 2, the recording medium used with the player 200 is a mini-disc 202. The speaker 107 is preferably replaced with a headphones port 201 into which a pair of headphones or other listening device can be plugged to receive the audio signal 108 from the processor 103.

Audio and musical programming is not typically sold commercially on mini-discs at present. However, mini-disc recording systems, typically in conjunction with a computer, can be used to record a collection of musical or audio programming as desired by the user.

Figure 4:
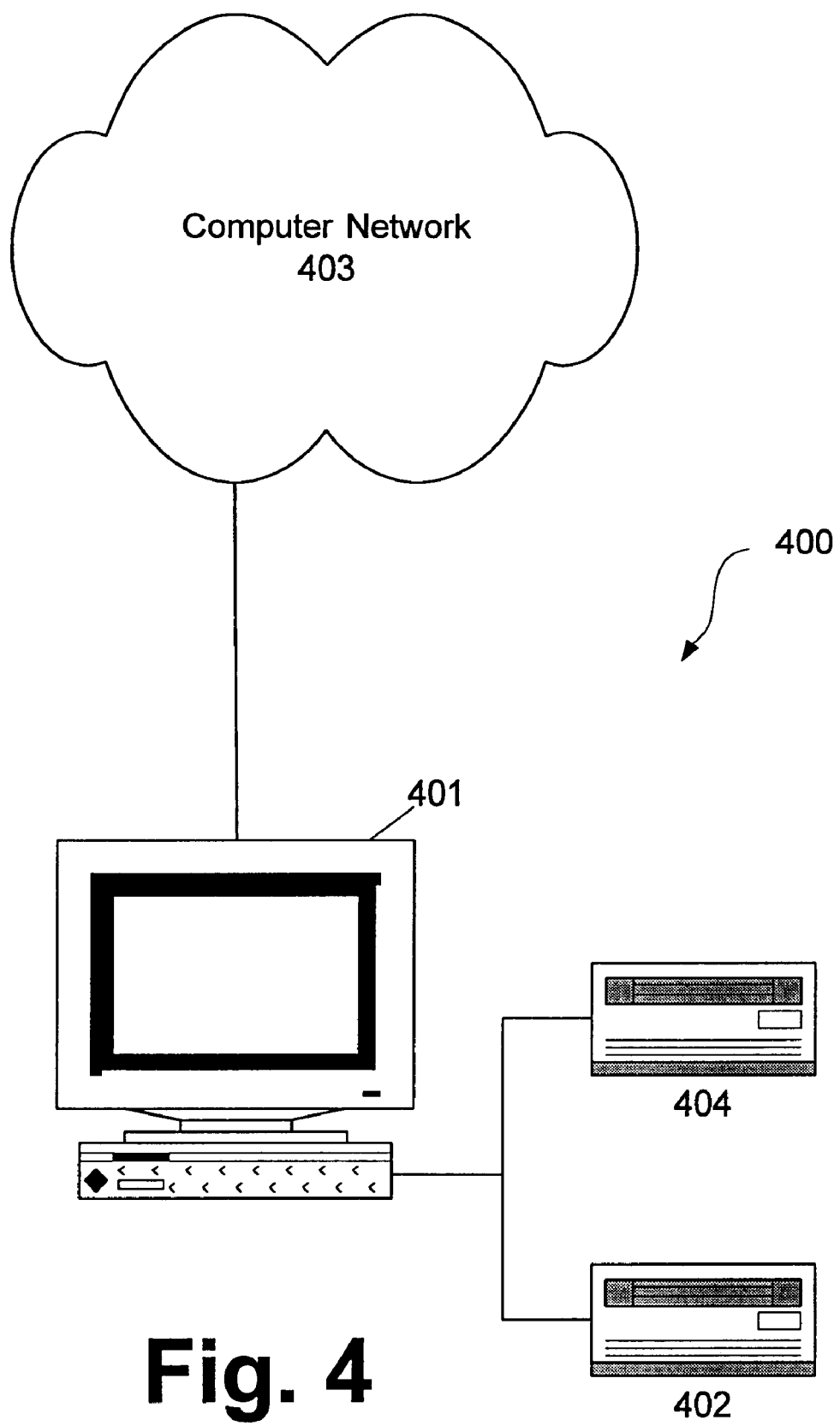
FIG. 4 illustrates a system for creating recording of audio programming in combination with contextual information according to the principles of the present invention.

As shown in FIG. 4, a computer 401, or other processor, is connected to a mini-disc writer 402. With the computer 401, a user may organize a collection of audio programming which is to be recorded on a mini-disc by the mini-disc writer 402. Audio programming may be taken from existing compact discs or other recording medium. For this purpose, a CD player 404, for example, or other recording media reader, may be connected to the computer 401.

The user will also include contextual information associated with the audio or musical programming. The contextual information may be feed into the computer from a network 403, for example the internet. Audio programming may also be provided to the computer 401 over the network 403. Using the computer 401, the user may then select audio programming and associated contextual information to be written to a mini-disc by mini-disc writer 402.

Under the principles of the present invention, the system 400 shown in FIG. 4 may be a privately owned system or may be a public system used to vend musical recordings. If the system 400 is a public system, it may accept payment for recording a mini-disc with audio programming and associated contextual information. Such a system 400 may be located anywhere a customer wishes to purchase a recording of audio programming, for example, in a music store, in a shopping mall, in a recreational area, etc.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. An audio system for reading audio/visual content, wherein said content having audio programming and contextual information relating to said audio programming, said system comprising:
   a processor;
   an audio transducer;
   a display device;
   a recording medium for storing said content;
   a recorder/reader comprising:
      a recorder for writing said content onto said recording medium; and
      a reader for reading said content from said recording medium, wherein said reader:
         separates said audio programming from said contextual information;
         transfers said audio programming from said reader to said processor over an audio signal link; and
         transfers said contextual information from said reader to said processor over a data signal link, said data signal link being separate and distinct from said audio signal link.

2. The audio system of claim 1, wherein said recording medium is removably interfaced with said recorder/reader.

3. The audio system of claim 1, wherein said reader is controlled by said processor to receive said content stored on said recording medium.

4. The audio system of claim 1, wherein said processor:
   displays said contextual information on a display device;
   supplies said audio signal to said audio transducer; and
   accepts payment for compiling said content on said recording medium.

5. The audio system of claim 1, wherein said display device comprises a liquid crystal display.

6. The audio system of claim 1, wherein said display device comprises a touch screen.

7. The audio system of claim 6, wherein said touch screen receives user input.

8. The audio system of claim 7, wherein said user input is transmitted to said processor for controlling display of said contextual information and playback of said audio programming.

9. The audio system of claim 1, further comprising a user input device for controlling said processor in accessing and displaying said content.

10. The audio system of claim 9, wherein said user input device comprises one of a trackball and a selection button and a four-way button and a selection button.

11. The audio system of claim 1, wherein said audio transducer comprises one of a speaker and a headphone.

12. The audio system of claim 1, wherein said audio system is a self-contained, battery-powered personal audio system.

13. The audio system of claim 1, wherein said processor is connected to a computer network for receiving said content from said computer network.

14. The audio system of claim 1, wherein said content further comprises on of an image signal and a text signal.

15. An audio system for reading audio/visual content, wherein said content having audio programming and contextual information relating to said audio programming, said system comprising:

recording medium means for storing said content;

recorder means for writing said content onto said recording medium means; and reader means for reading said content from said recording medium means, wherein said reader means:

separates said audio programming from said contextual information;

transfers said audio programming from said reader means to a processor over an audio signal link; and transfers said contextual information from said reader means to said processor over a data signal link, said data signal link being separate and distinct from said audio signal link.

* * * * *